(12) United States Patent
Stull et al.

(10) Patent No.: US 11,596,998 B2
(45) Date of Patent: Mar. 7, 2023

(54) TERMINAL LOCATOR FOR A HAND TOOL

(71) Applicant: TE Connectivity Services GmbH, Schaffhausen (CH)

(72) Inventors: David Michael Stull, Middletown, PA (US); Caleb Andrew Moyer, Middletown, PA (US)

(73) Assignee: TE Connectivity Solutions GmbH

(*) Notice: Subject to any disclaimer, the term of this patent is extended or adjusted under 35 U.S.C. 154(b) by 52 days.

(21) Appl. No.: 16/915,136

(22) Filed: Jun. 29, 2020

(65) Prior Publication Data
US 2021/0402456 A1 Dec. 30, 2021

(51) Int. Cl.
| H01R 43/042 | (2006.01) |
| B25B 27/14 | (2006.01) |
| B25B 11/00 | (2006.01) |
| B21D 39/04 | (2006.01) |
| G01B 7/14 | (2006.01) |

(52) U.S. Cl.
CPC .......... *B21D 39/048* (2013.01); *B25B 11/002* (2013.01); *B25B 27/146* (2013.01); *G01B 7/14* (2013.01); *H01R 43/042* (2013.01)

(58) Field of Classification Search
CPC ... B25B 11/002; B25B 27/146; H01R 43/015; H01R 43/042–045; Y10T 29/53226; H01F 7/0221; F16B 2001/0035; F16B 21/07–078
See application file for complete search history.

(56) References Cited

U.S. PATENT DOCUMENTS

| 5,685,174 | A | * | 11/1997 | Balzer | ............... | A44B 17/0082 |
| | | | | | | 63/29.1 |
| 6,155,095 | A | * | 12/2000 | Beetz | ............... | B25B 27/146 |
| | | | | | | 72/461 |
| 6,161,416 | A | | 12/2000 | Wilhelm et al. | | |
| 8,161,789 | B2 | | 4/2012 | Battenfeld | | |
| 8,601,856 | B2 | | 12/2013 | Battenfeld | | |
| 2009/0058583 | A1 | * | 3/2009 | Maddocks | ............ | B29C 65/08 |
| | | | | | | 425/500 |
| 2009/0249855 | A1 | | 10/2009 | Battenfeld et al. | | |
| 2011/0030447 | A1 | | 2/2011 | Backenstoes et al. | | |
| 2018/0083403 | A1 | | 3/2018 | Pletsch | | |
| 2020/0198116 | A1 | * | 6/2020 | Skrobot | ............... | B25B 27/146 |
| 2020/0316485 | A1 | * | 10/2020 | Haughey | ............... | F16B 21/073 |

FOREIGN PATENT DOCUMENTS

| EP | 3300187 A1 | 9/2016 |
| JP | S58165877 A1 | 9/1983 |

OTHER PUBLICATIONS

PCT International Search Report, Application No. PCT/IB2021/055638, dated Jun. 25, 2021, 5 pages.

* cited by examiner

*Primary Examiner* — Tyrone V Hall, Jr.

(57) ABSTRACT

A terminal locator for a hand tool includes a base, a magnet, and a holder attached to the base and rotatable with respect to the base between an open position and a closed position. The holder has a magnet passageway and a resilient latch retaining the magnet in the magnet passageway.

17 Claims, 8 Drawing Sheets

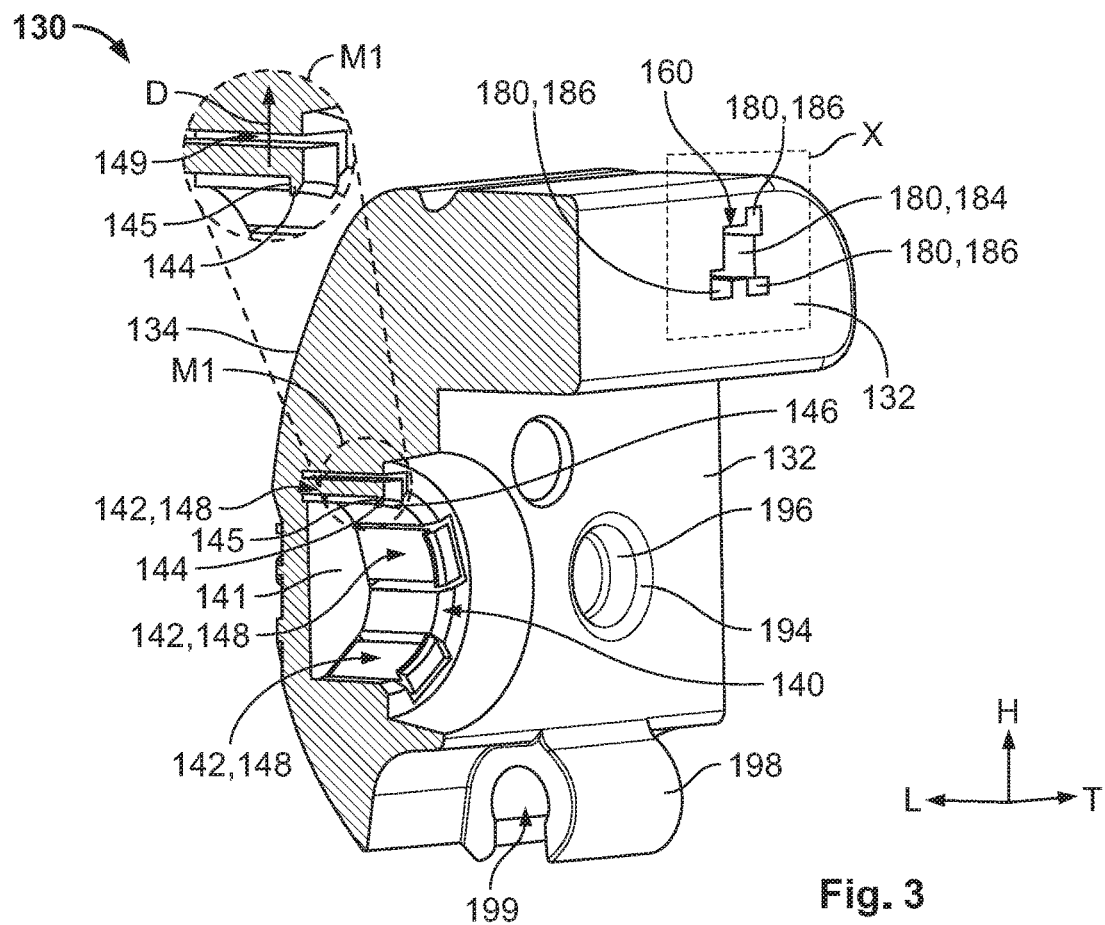
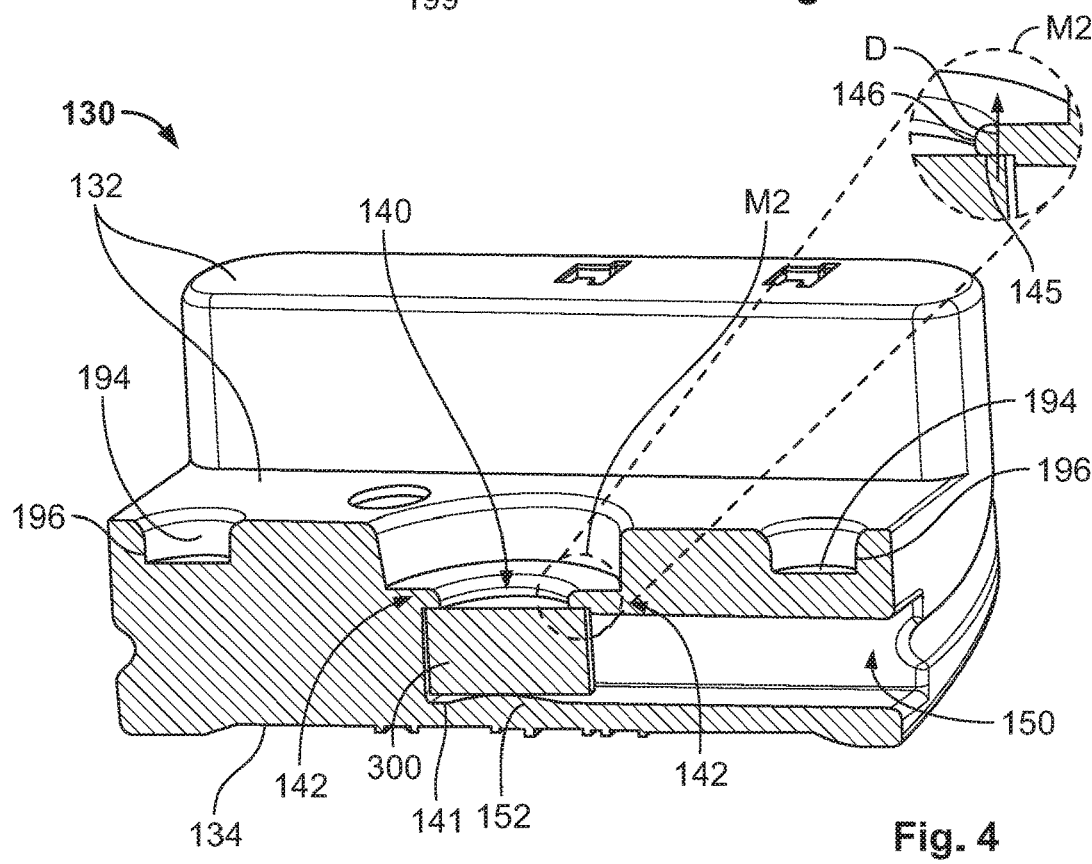

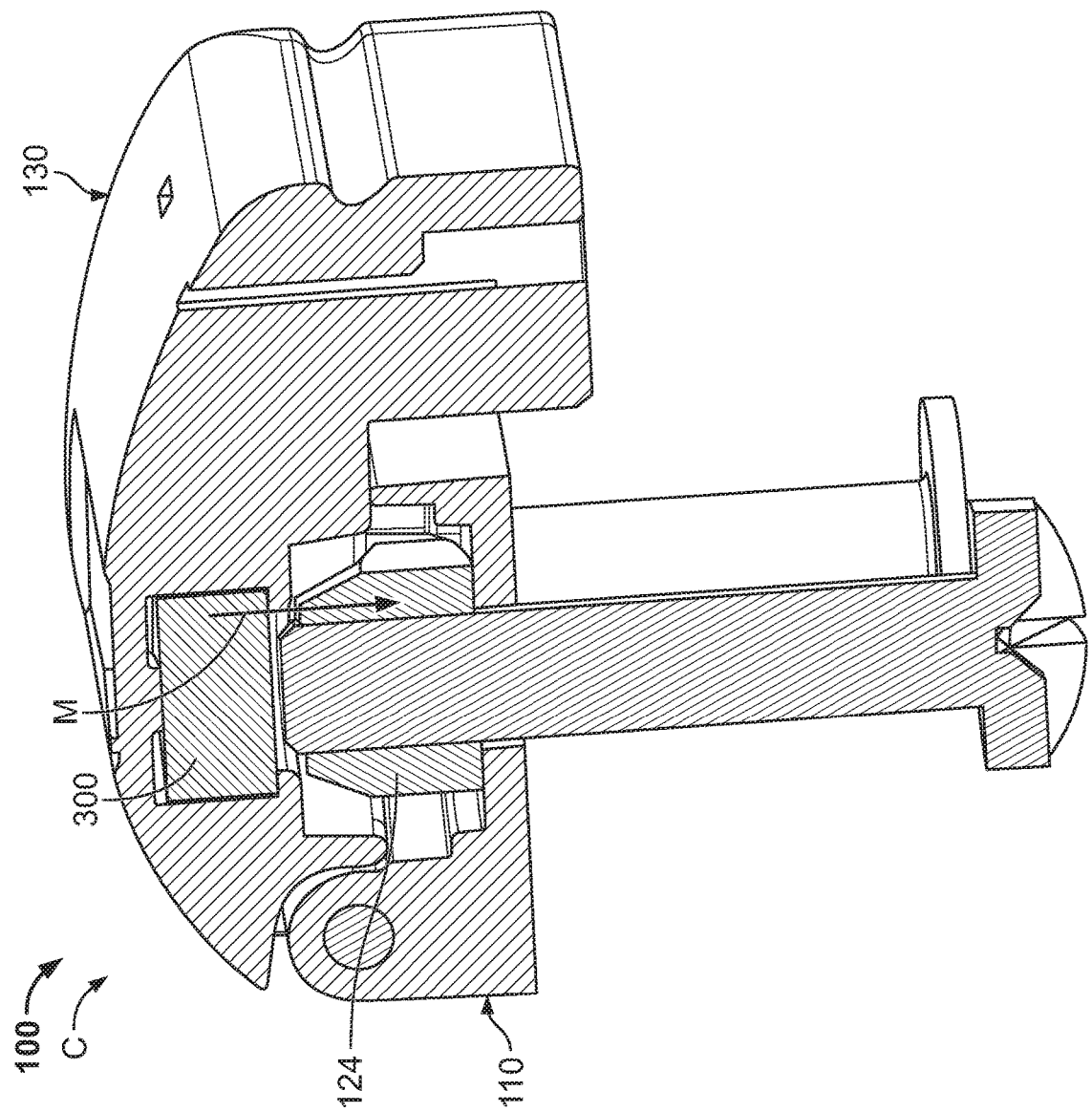

TERMINAL LOCATOR FOR A HAND TOOL

FIELD OF THE INVENTION

The present invention relates to a hand tool and, more particularly, to a locator of a hand tool for locating a terminal within the hand tool.

BACKGROUND

A hand tool generally includes a crimp tooling and locator holding a terminal. The locator locates the terminal in a precise position with respect to the crimp tooling to permit the hand tool to properly crimp the terminal.

The locator has a number of small volumes holding the terminal and other elements that allow the terminal to be precisely positioned. Manufacturing these small volumes with the required precision, however, requires the use of highly accurate manufacturing methods, which increases the cost of producing the hand tool with the locator.

SUMMARY

A terminal locator for a hand tool includes a base, a magnet, and a holder attached to the base and rotatable with respect to the base between an open position and a closed position. The holder has a magnet passageway and a resilient latch retaining the magnet in the magnet passageway.

BRIEF DESCRIPTION OF THE DRAWINGS

The invention will now be described by way of example with reference to the accompanying Figures, of which:

FIG. 3 is a sectional perspective view of a holder of the terminal locator according to an embodiment;

FIG. 4 is a sectional perspective view of a holder according to another embodiment;

FIG. 11 is another sectional perspective view of the terminal locator in the closed position.

DETAILED DESCRIPTION OF THE EMBODIMENTS

Figure 1:
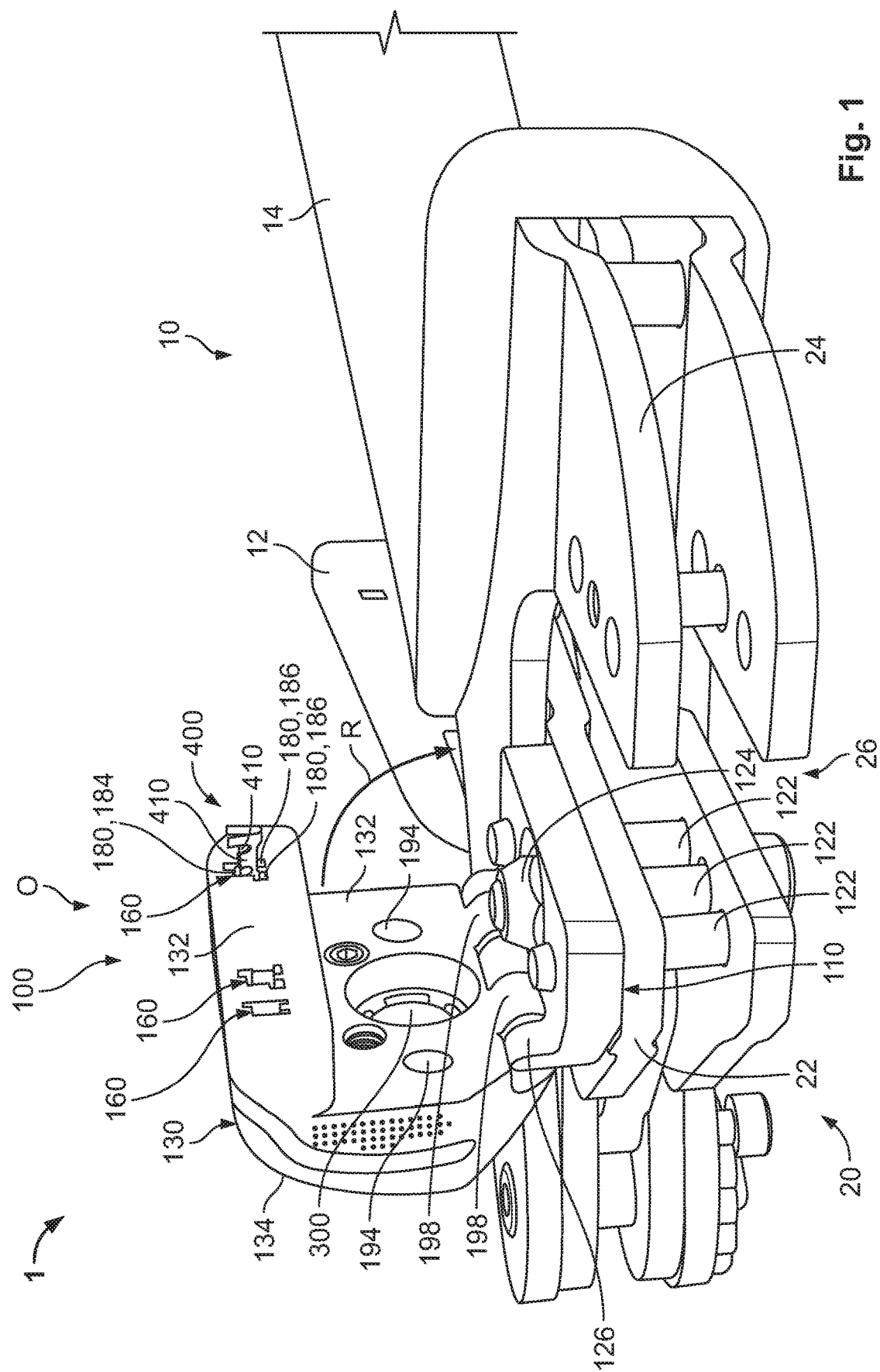
FIG. 1 is a perspective view of a hand tool according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

A hand tool 1 according to an embodiment, as shown in FIG. 1, comprises a pair of levers 10, a pair of tool frames 20 connected to the pair of levers 10, and a terminal locator 100 connected to one of the pair of tool frames 20.

The pair of levers 10 include a first lever 12 and a second lever 14, as shown in FIG. 1. The pair of tool frames 20 include a first tool frame 22 connected to the first lever 12 and a second tool frame 24 connected to the second lever 14. The pair of levers 10 are pivotable with respect to one another, and pivoting motion of the levers 10 moves the pair of tool frames 20 toward and away from each other.

The terminal locator 100, as shown in FIG. 1, has a base 110 attached to the first tool frame 22 and a holder 130 attached to the base 110.

Figure 2:
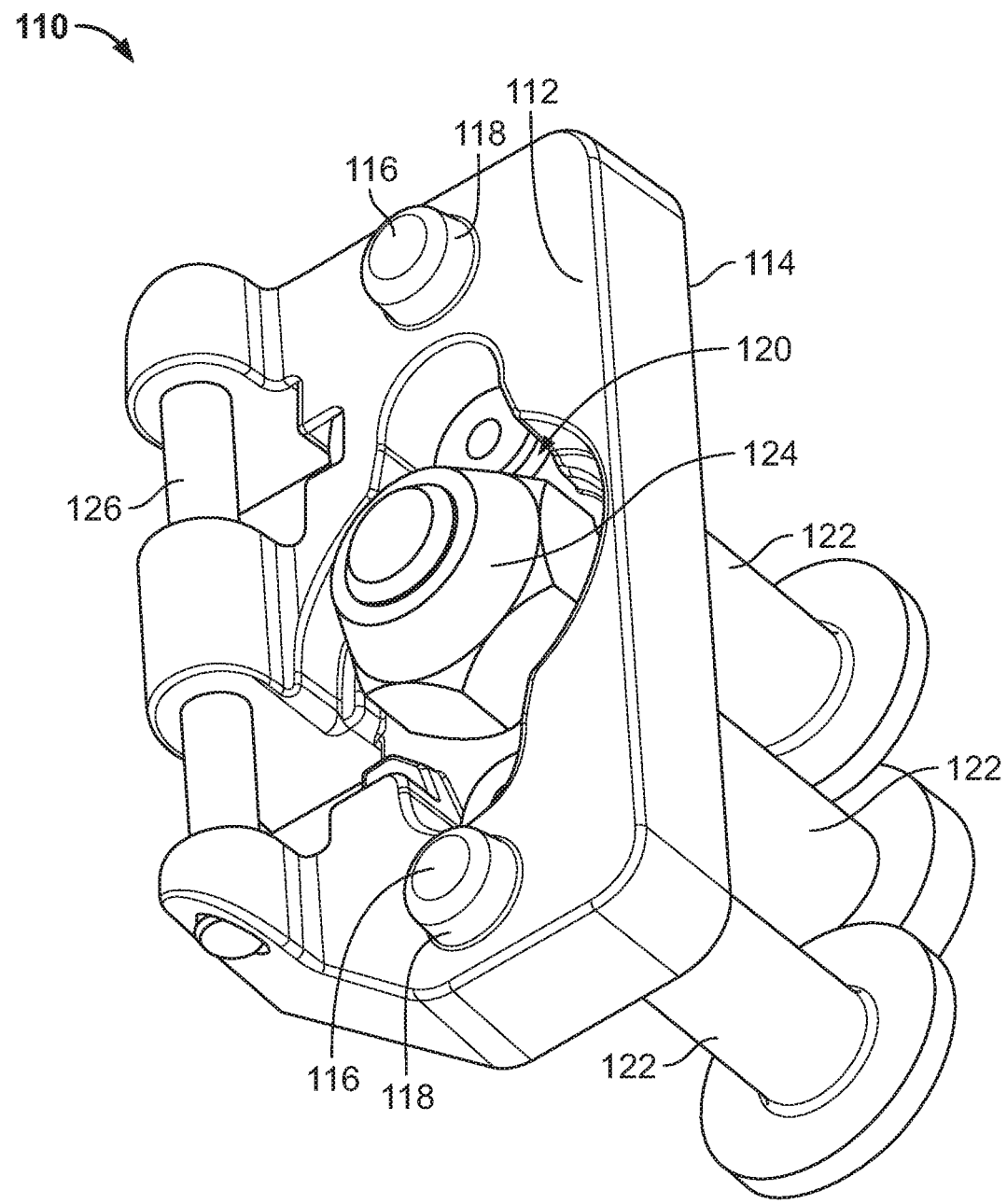
FIG. 2 is a perspective view of a base of a terminal locator according to an embodiment.

The base 110, as shown in FIG. 2, has an upper surface 112 and a lower surface 114 opposite the upper surface 112. The base 110 has a plurality of standoffs 116 protruding from the upper surface 112. In the embodiment shown in FIG. 2, each of the standoffs 116 has a sloped side 118; the standoffs 116 have a larger cross-sectional area at the upper surface 112 of the base 110 than at an end of the standoff 116 opposite the upper surface 112 due to the sloped side 118. The base 110 has two standoffs 116 in the shown embodiment. In other embodiments, the base 110 may have only one standoff 116 or may have more than two standoffs 116. The base 110, as shown in FIG. 2, has a fastener opening 120 extending into the upper surface 112.

In the embodiment shown in FIG. 2, the base 110 is monolithically formed in a single piece with the upper surface 112, the lower surface 114, the standoffs 116, and the fastener opening 120. These portions of the base 110 may be formed by molding, for example, by injection molding.

The base 110, as shown in FIG. 2, has a pivot shaft 126 extending along a side of the base 110. In the shown embodiment, the pivot shaft 126 is fixed with respect to the base 110. In other embodiments, the pivot shaft 126 may be rotatable with respect to the base 110.

The holder 130, as shown in FIGS. 1, 3 and 4, has an interior surface 132 and an exterior surface 134 opposite the interior surface 132. The holder 130 has a magnet passageway 140 extending into the interior surface 132 and a resilient latch 142 surrounding the magnet passageway 140, as shown in the embodiments of FIGS. 3 and 4. The resilient latch 142 has a protrusion 144 at an end of the resilient latch 142. In the embodiments shown in FIGS. 3 and 4, the protrusion 144 has a flat side 145 and a chamfer side 146 opposite the flat side 145.

A magnet 300, shown in FIGS. 1 and 4, is positioned and retained in the magnet passageway 140. Different embodiments of the insertion of the magnet 300 and retention of the magnet 300 by the resilient latch 142 are shown in FIGS. 3 and 4.

In the embodiment shown in FIG. 3, the resilient latch 142 has a plurality of latch segments 148 identical to one another and separated around a circumference of the magnet passageway 140. As shown in the magnified portion M1, the holder 130 has a latch recess 149 positioned adjacent each of the latch segments 148 of the resilient latch 142, on a side of the resilient latch 142 opposite the magnet passageway 140. The resilient latch 142, at each of the latch segments 148, is elastically deformable in a deformation direction D toward the latch recess 149.

In the embodiment shown in FIG. 3, the magnet 300 contacts the chamfer side 146 of each of the latch segments 148 of the resilient latch 142 and deflects the resilient latch 142 in the deformation direction D as the magnet 300 is inserted into the magnet passageway 140. When the magnet 300 is inserted to a position abutting a bottom surface 141 of the magnet passageway 140, the latch segments 148 of the resilient latch 142 elastically return to an undeformed position with the flat side 145 abutting the magnet 300, as similarly shown in the embodiment of FIG. 4, retaining the magnet 300 in the magnet passageway 140.

In the embodiment shown in FIG. 4, the holder 130 has an insertion passageway 150 extending into the holder 130 in a direction perpendicular or approximately perpendicular to the magnet passageway 140. The resilient latch 142 in the embodiment of FIG. 4 extends continuously around the circumference of the magnet passageway 140. The bottom surface 141 of the magnet passageway 140 has a projection 152 extending into the magnet passageway 140 in the embodiment of FIG. 4.

The magnet 300 is inserted into the insertion passageway 150 in the embodiment of FIG. 4. The magnet 300 moves along the insertion passageway 150 into contact with the projection 152. Contact of the magnet 300 with the projection 152 tilts the magnet 300 and pushes the magnet 300 against the resilient latch 142, deflecting the resilient latch 142 in the deformation direction D shown in the magnified portion M2 in FIG. 4. When the magnet 300 is inserted to a position centered on the projection 152, the resilient latch 142 elastically returns to an undeformed position with the flat side 145 abutting the magnet 300. The magnet 300 is held between the resilient latch 142 and the projection 152, retaining the magnet 300 in the magnet passageway 140.

Figure 5:
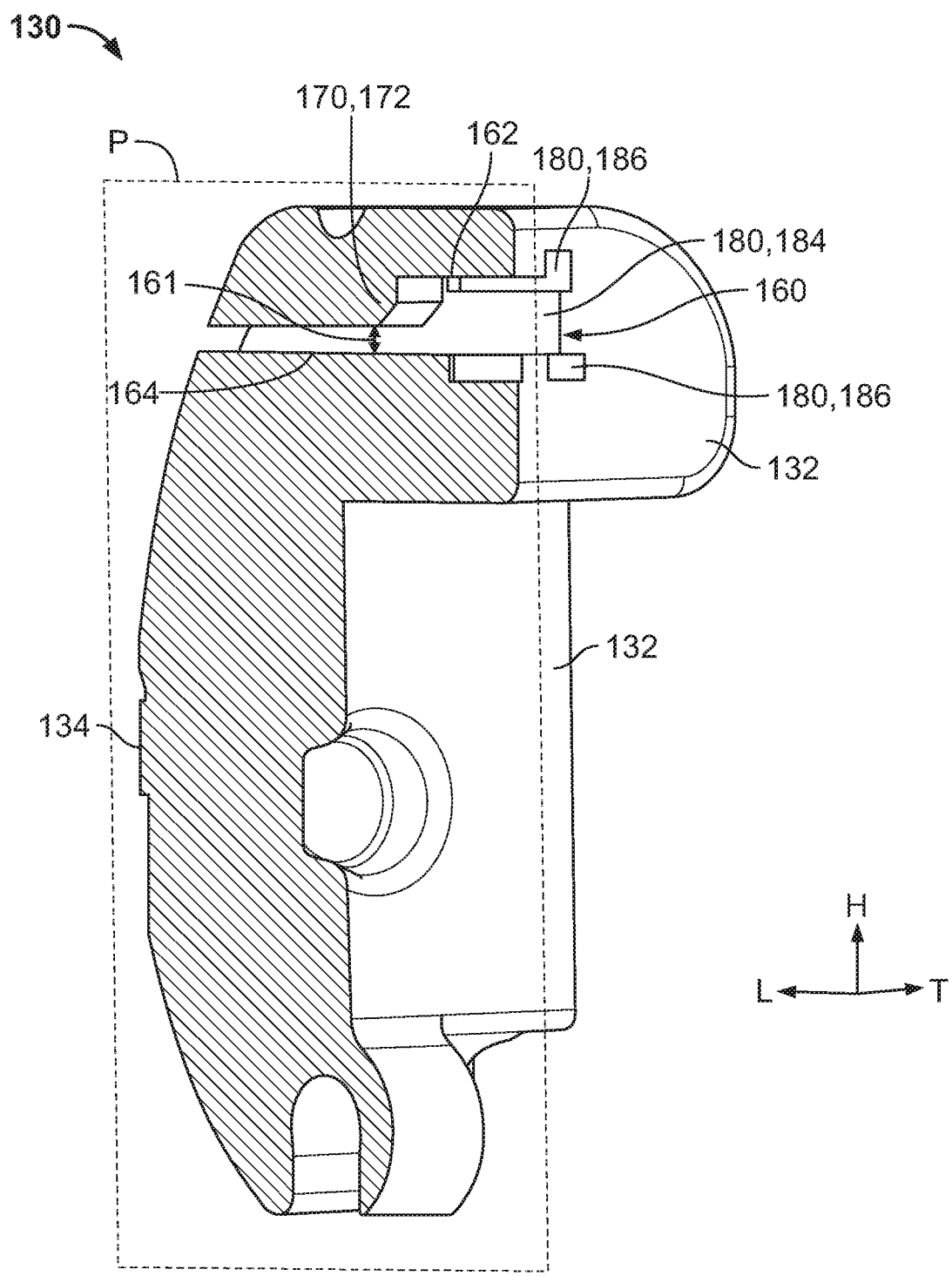
FIG. 5 is a sectional perspective view of the holder of FIG. 3.

The holder 130, as shown in FIGS. 1, 3, and 5, has a plurality of terminal receiving passageways 160 extending into the holder 130. The terminal receiving passageways 160 extend into the interior surface 132 and, in the embodiment shown in FIG. 5, extend through the holder 130 to the exterior surface 134 in a longitudinal direction L of the terminal receiving passageways 160.

Each of the terminal receiving passageways 160, as shown in FIG. 5, has a pair of inner walls 162, 164 extending along the longitudinal direction L. The pair of inner walls 162, 164 include an upper inner wall 162 and a lower inner wall 164 opposite the upper inner wall 162 in a height direction H perpendicular to the longitudinal direction L. The terminal receiving passageway 160 has a retention element 170 disposed on one of the pair of inner walls 162, 164 and extending into the terminal receiving passageway 160. The retention element 170 narrows a height 161 of the terminal receiving passageway 160 in the height direction H. Various embodiments of the retention element 170 are shown in FIGS. 5-7.

In the embodiment shown in FIG. 5, the retention element 170 is a step 172 on the upper inner wall 162 extending into the terminal receiving passageway 160.

Figure 6:
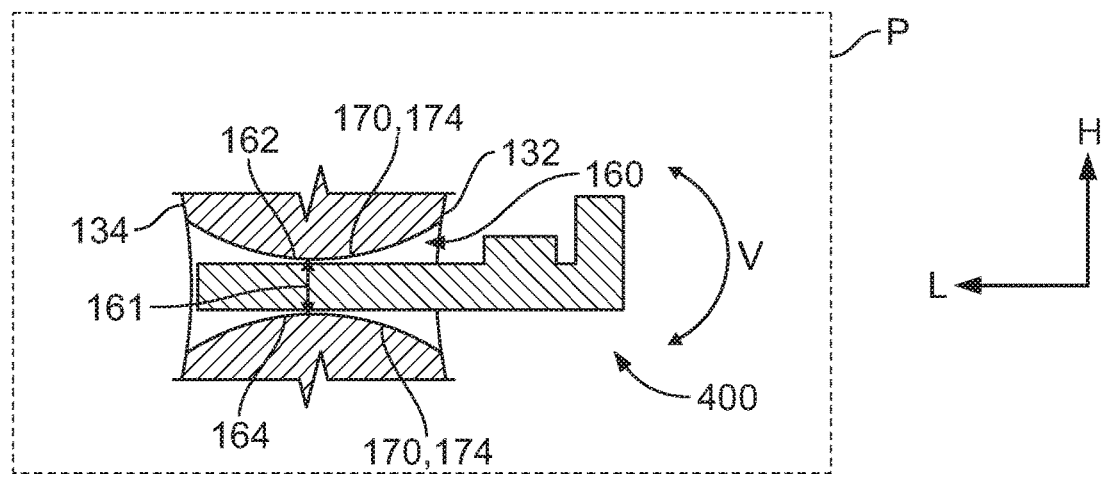
FIG. 6 is a schematic diagram of a retention element of a holder according to an embodiment.

In the embodiment shown in FIG. 6, the retention element 170 is a curved shape 174 of each of the upper inner wall 162 and the lower inner wall 164 along the longitudinal direction L. In another embodiment, the curved shape 174 may be on only one of the inner walls 162, 164.

Figure 7:
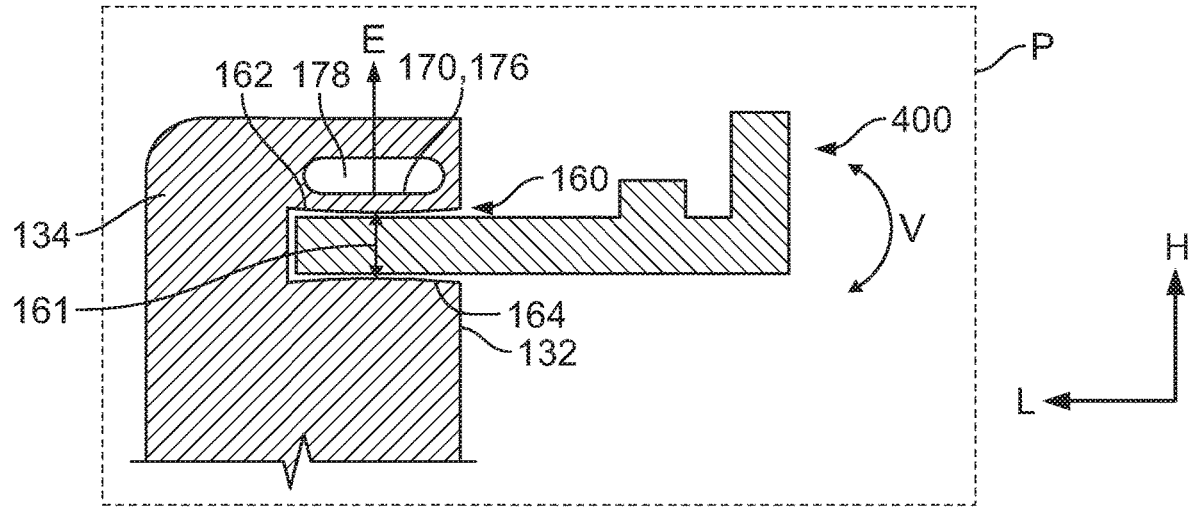
FIG. 7 is a schematic diagram of a retention element according to another embodiment.

In the embodiment shown in FIG. 7, the retention element 170 is an elastic portion 176 of the upper inner wall 162. The holder 130 has an elastic recess 178 positioned adjacent the elastic portion 176 in the height direction H. The elastic portion 176 is elastically deformable in an elastic direction E parallel to the height direction H toward the elastic recess 178. In the embodiment shown in FIG. 7, the terminal receiving passageway 160 extends into the interior surface 132 but does not extend to the exterior surface 134.

Each of the terminal receiving passageways 160 receives a terminal 400, as shown in FIGS. 1, 6, and 7. The retention element 170, according to the various embodiments described above with reference to FIGS. 5-7, retains and positions the terminal 400 in the terminal receiving passageway 160 at the narrowed height 161. In the embodiments of FIGS. 5 and 6, the step 172 and the curved shape 174, respectively, retain and position the terminal 400 as the terminal 400 is inserted into the terminal receiving passageway 160. In the embodiment shown in FIG. 7, the terminal 400 inserted into the terminal receiving passageway 160 deflects the elastic portion 176 in the elastic direction E. The elastic portion 176 applies an elastic force on the terminal 400, retaining and positioning the terminal 400 in the terminal receiving passageway 160 by an interference fit.

In each of the embodiments shown in FIGS. 5-7, the retention element 170 prevents movement of the terminal 400 in the terminal receiving passageway 160 in a lateral direction T shown in FIG. 5 that is transverse to the longitudinal direction L and the height direction H. In directions other than the lateral direction T, the retention element 170 of the embodiment of FIG. 5 differs in restriction of movement of the terminal 400 from the embodiments of FIGS. 6 and 7, as will now be described in greater detail.

The retention element 170 formed as the step 172 in the embodiment of FIG. 5 further prevents movement of the terminal 400 in a pivot plane P. The pivot plane P spans the longitudinal direction L and the height direction H and is perpendicular to the lateral direction T.

The retention element 170 shown in the embodiments of FIGS. 6 and 7 retains the terminal 400 at the narrowed height 161 with either a larger space on both ends of the narrowed height 161, as in FIG. 6, or the elastic portion 176 creating the narrowed height 161, as in FIG. 7. The retention element 170 in the embodiments shown in FIGS. 6 and 7, while preventing movement of the terminal 400 in the lateral direction T, permits a pivoting movement V of the terminal 400 within the terminal receiving passageway 160 along the pivot plane P.

Figure 8:
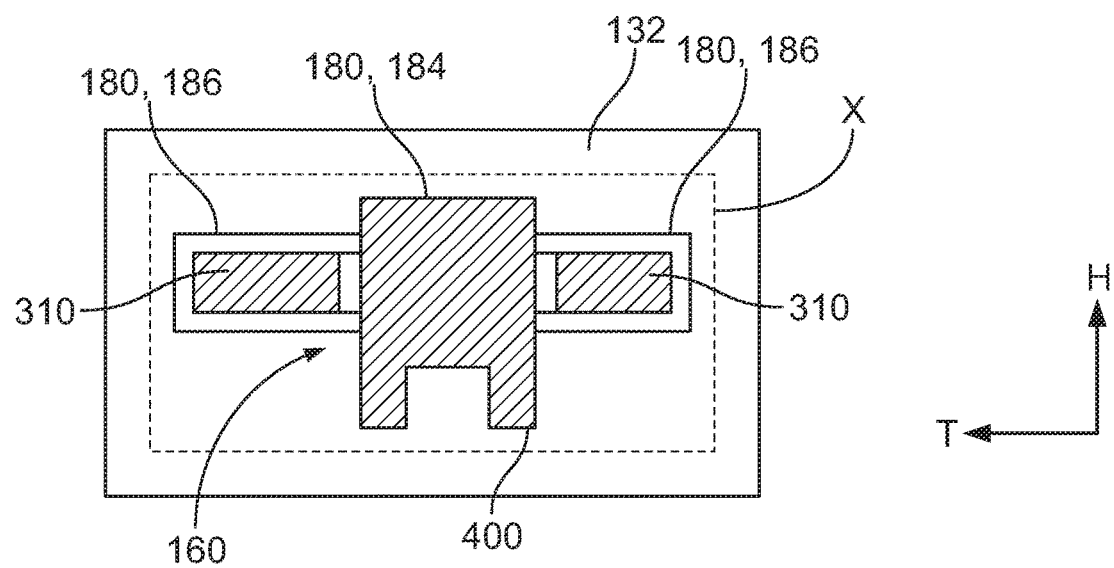
FIG. 8 is a schematic diagram of a terminal receiving passageway of a holder according to an embodiment.

The terminal receiving passageway 160, as shown in FIGS. 1, 3, and 8, is formed of a plurality of cavity features 180 in a cross-sectional plane X transverse to the longitudinal direction L. The cavity features 180 include a main cavity feature 184 and a plurality of extension cavity features 186 connected to the main cavity feature 184. In the shown embodiment, each of the cavity features 180 has a quadrilateral shape in the cross-sectional plane X. The main cavity feature 184 receives the terminal 400 and the extension cavity features 186 do not receive a portion of the terminal 400.

In the embodiment shown in FIG. 8, the terminal locator 100 includes an insert 310 disposed in each of the extension cavity features 186. In another embodiment, the insert 310 may only be disposed in one of the extension cavity features 186. The insert 310 aids in the positioning of the terminal 400 in the terminal receiving passageway 160. In the embodiment shown in FIG. 8, the inserts 310 help position the terminal 400 in the lateral direction T. In an embodiment, the insert 310 is a piece of metal, for example a piece of sheet metal, and is precision sized to fit in the extension cavity feature 186. The insert 310 may be precision sized, for example, by photo chemical etching. In other embodiments, the insert 310 could be formed of other materials, such as plastics, that permit precision sizing.

Figure 9:
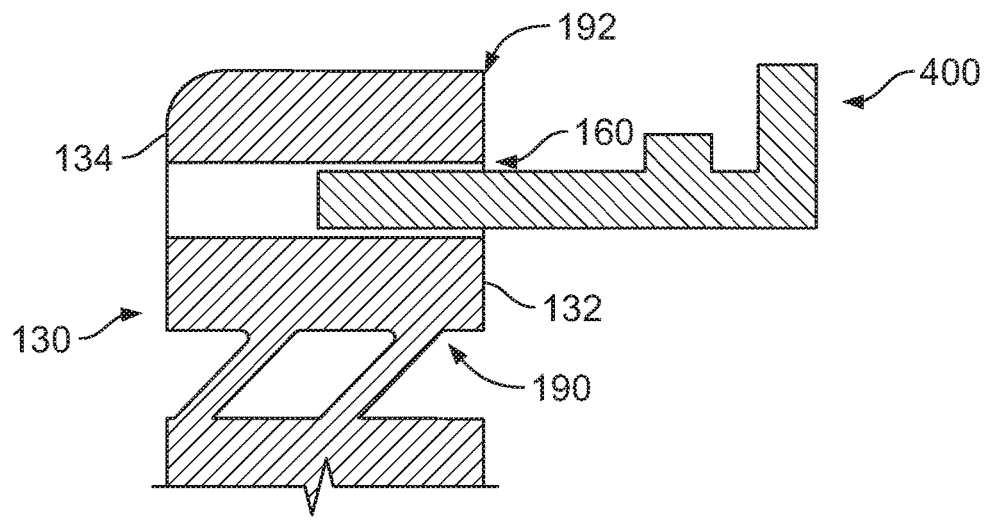
FIG. 9 is a schematic diagram of a holder according to another embodiment.

In another embodiment shown in FIG. 9, the holder 130 includes a compliant section 190 and a rigid section 192 attached to the complaint section 190. The terminal receiving passageway 160 extends into the rigid section 192. The compliant section 190 connects the rigid section 192 to a remainder of the holder 130. The compliant section 190 is structured to elastically deform under an applied force; the rigid section 192, although not deforming itself, moves with the deformation of the complaint section 190 to which it is attached. In the shown embodiment, the compliant section 190 is a linkage connecting the rigid section 192 to a remainder of the holder 130. In another embodiment, the compliant section 190 is a sponge structure. In an embodiment, the compliant section 190 and the rigid section 192 are formed of a same material, as described in greater detail below.

The holder 130, as shown in FIGS. 1, 3, and 4, has a plurality of alignment recesses 194 extending into the interior surface 132. In the shown embodiments, each of the alignment recesses 194 has a sloped side 196; the alignment recesses 194 have a larger cross-sectional area at the interior surface 132 than at an end of the alignment recess 194 disposed between the interior surface 132 and the exterior surface 134 due to the sloped side 196. The holder 130 has two alignment recesses 194 in the shown embodiment. In other embodiments, the holder 130 may have only one alignment recess 194 or may have more than two alignment recesses 194.

The holder 130, as shown in FIGS. 1 and 3, has a plurality of shaft portions 198 arranged along a side of the holder 130. In the embodiment shown in FIG. 3, each of the shaft portions 198 is formed in a C-shape and defines a pivot shaft receiving passageway 199. In another embodiment, each of the shaft portions 198 may be formed in an O-shape surrounding the pivot shaft receiving passageway 199.

In each of the embodiments described above and shown in FIGS. 1 and 3-9, the holder 130 is monolithically formed in a single piece. In an embodiment, the holder 130 is formed in the single piece by additive manufacturing, such as 3D printing. The holder 130 is formed in the single piece with at least one of the magnet passageway 140, the resilient latch 142, the terminal receiving passageway 160, the complaint section 190, the rigid section 192, the alignment recess 194, and the shaft portion 198. The holder 130 may be formed of any rigid material that is easily manipulated for additive manufacturing, such as a polymer, a ceramic, or a metal.

To assemble the hand tool 1, as shown in FIG. 1, the base 110 is attached to the first tool frame 22. The lower surface 114 of the base 110 is positioned on the first tool frame 22 and a plurality of fasteners 122, shown in FIGS. 1 and 2, are inserted extending through the first tool frame 22 and through the lower surface 114 into the fastener opening 120. A nut 124 is positioned on an end of at least one of the fasteners 122 and is tightened to hold the base 110 on the first tool frame 22. The nut 124 is disposed in the fastener opening 120 in an assembled position of the base 110 on the first tool frame 22. The nut 124 is formed of a ferromagnetic material.

As shown in FIG. 1, the holder 130 is attached to and rotatable about the pivot shaft 126 of the base 110, with the upper surface 112 facing the interior surface 132. The shaft portions 198 of the holder 130 are attached to the pivot shaft 126. In the embodiment shown in FIGS. 1-3, the C-shaped shaft portions 198 are snapped onto the pivot shaft 126 and are interference fit with the pivot shaft 126. The holder 130 may be attached to the base 110 before or after the base 110 is attached to the first tool frame 22.

In the open positon O shown in FIG. 1, the terminal 400 is positioned in the terminal receiving passageway 160. In an embodiment, one terminal 400 may be positioned in each of the terminal receiving passageways 160. The retention element 170 retains and positions the terminal 400 in the terminal receiving passageway 160.

Figure 10:
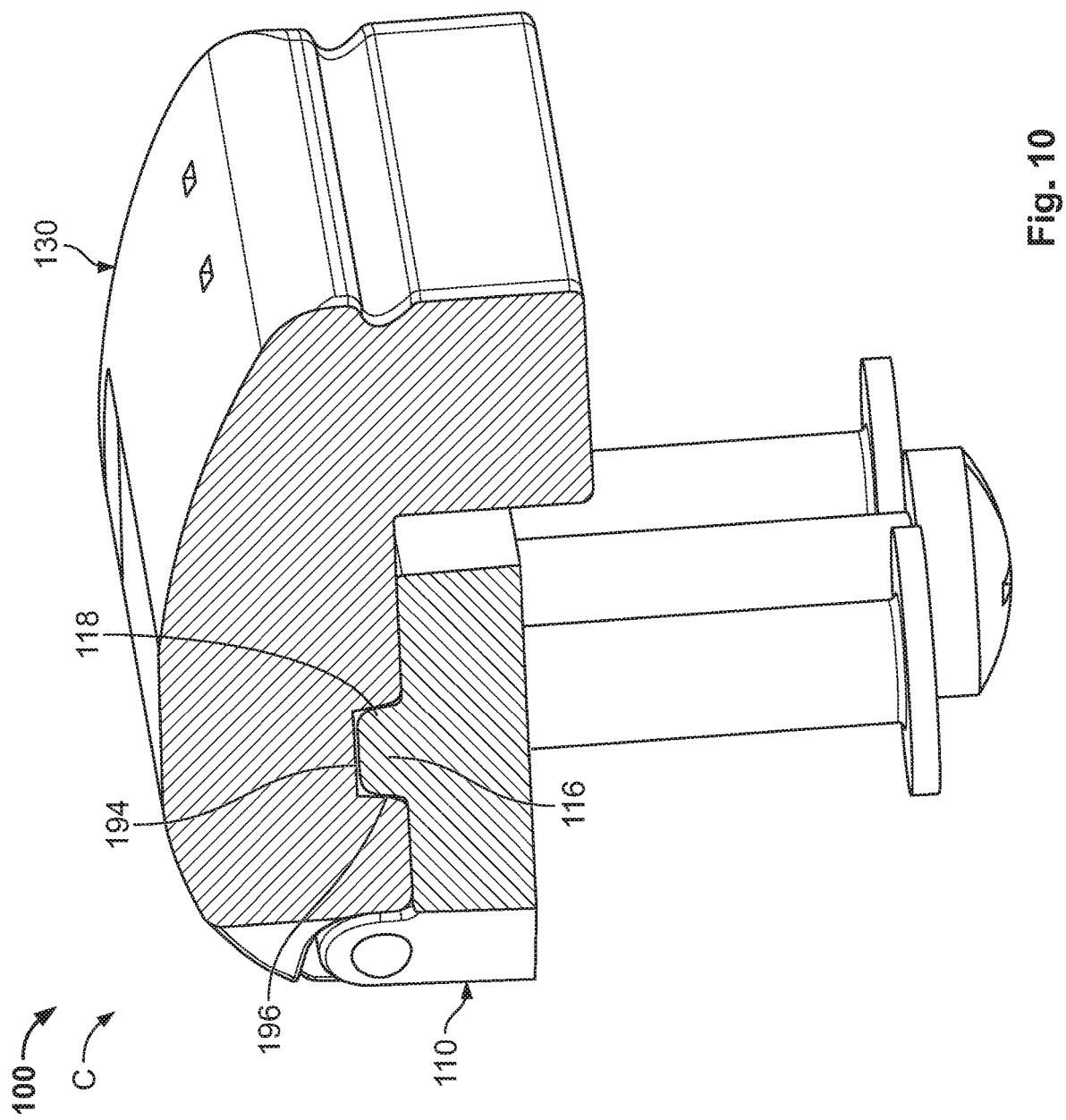
FIG. 10 is a sectional perspective view of the terminal locator in a closed position.

The holder 130 is rotatable with respect to the base 110 about a rotation direction R between an open position O, shown in FIG. 1, and a closed position C, shown in FIGS. 10 and 11. The interference fit of the shaft portions 198 with the pivot shaft 126 allows the holder 130 to remain stationary with respect to the base 110 in any position between the open position O and the closed position C. The holder 130 rotates to the closed position C in order to position the terminal 400 held in the terminal receiving passageway 160 in a receiving opening 26 between the tool frames 20.

The holder 130 is rotated to the closed position C with the terminal 400 positioned in the terminal receiving passageway 160. As shown in FIG. 10, as the holder 130 moves to the closed position C, each of the standoffs 116 engages one of the alignment recesses 194 to locate the holder 130 with respect to the base 110 in the closed position C. The interaction of the sloped side 118 of the standoff 116 with the sloped side 196 of the alignment recess 194 helps to guide the holder 130 into the proper closed position C. As shown in FIG. 11, a magnetic force M between the magnet 300 and the nut 124 also acts to locate the holder 130 with respect to the base 110 in the closed position C.

The precise locating of the holder 130 with respect to the base 110 in the closed position C properly positions the terminal 400 for crimping in the receiving opening 26 shown in FIG. 1. Each of the first tool frame 22 and the second tool frame 24 has a crimp tooling and, when the terminal 400 is precisely positioned in the receiving opening 26, the first tool frame 22 and the second tool frame 24 crimp the terminal 400 by action of the pair of levers 10 moving the tool frames 20 toward each other.

In the terminal locator 100 for the hand tool 1 according to the embodiments described herein, the use of additive manufacturing allows the formation of elements of the holder 130 that would be expensive and/or difficult to form with molding and other process techniques, for example, the resilient latch 142 with the latch recess 149, the retention elements 170 of the various embodiments, and the compliant section 190. Further, the extension cavity features 186 are formed to allow the additive manufacturing to avoid distortion at the edges of the small terminal receiving passageway 160 and create the terminal receiving passageway 160 with the precision necessary to hold the terminal 400. Additionally, the embodiments in which the retention feature 170 permits the terminal 400 to have the pivoting movement V in the pivot plane P, and the embodiment in which the compliant section 190 is elastically deformable, permit some movement of the terminal 400 during crimping to help prevent bending of the terminal 400. The terminal locator 100 according to the embodiments described herein thus can be produced less expensively than with other processing techniques while retaining the same location precision of the terminal 400 required for proper crimping.

What is claimed is:

1. A terminal locator for a hand tool, comprising:
   a base;
   a magnet; and a holder attached to the base and rotatable with respect to the base between an open position and a closed position, the holder has a magnet passageway and a resilient latch retaining the magnet in the magnet passageway, the holder has an insertion passageway extending into the holder perpendicular to the magnet passageway, the magnet is held between the resilient latch and a projection on a bottom surface of the magnet passageway.

2. The terminal locator of claim 1, wherein the holder has a latch recess positioned adjacent the resilient latch, the resilient latch is elastically deformable in a direction toward the latch recess.

3. The terminal locator of claim 2, wherein the resilient latch has a plurality of latch segments separated around a circumference of the magnet passageway.

4. The terminal locator of claim 1, wherein the holder is monolithically formed in a single piece by additive manufacturing.

5. The terminal locator of claim 1, wherein the base has a fastener opening and a nut disposed in the fastener opening, a magnetic force between the magnet and the nut locates the holder with respect to the base in the closed position.

6. The terminal locator of claim 1, wherein the holder has a terminal receiving passageway in which a terminal is disposed, the terminal receiving passageway having a retention element retaining and positioning the terminal in the terminal receiving passageway.

7. The terminal locator of claim 6, wherein the retention element narrows a height of the terminal receiving passageway in a height direction perpendicular to a longitudinal direction of the terminal receiving passageway.

8. The terminal locator of claim 6, wherein the holder includes a compliant section and a rigid section attached to the compliant section, the terminal receiving passageway extends into the rigid section.

9. The terminal locator of claim 6, wherein the terminal receiving passageway has a plurality of cavity features in a cross-sectional plane transverse to the longitudinal direction, the plurality of cavity features include a main cavity feature receiving the terminal and at least one extension cavity feature that does not receive a portion of the terminal.

10. The terminal locator of claim 9, further comprising an insert disposed in the at least one extension cavity feature.

11. The terminal locator of claim 1, wherein the base has a standoff protruding from an upper surface of the base facing the holder, the holder has an alignment recess in an interior surface of the holder, the standoff engages the alignment recess to locate the holder with respect to the base in the closed position.

12. The terminal locator of claim 1, wherein the holder is attached to and rotatable about a pivot shaft of the base, the holder has a shaft portion interference fit with the pivot shaft.

13. A terminal locator for a hand tool, comprising:
a base;
a magnet; and
a holder attached to the base and rotatable with respect to the base between an open position and a closed position, the holder has a magnet passageway in which the magnet is disposed and a terminal receiving passageway in which a terminal is disposed, the terminal receiving passageway having a retention element retaining and positioning the terminal in the terminal receiving passageway.

14. The terminal locator of claim 13, wherein the retention element narrows a height of the terminal receiving passageway in a height direction perpendicular to a longitudinal direction of the terminal receiving passageway.

15. The terminal locator of claim 13, wherein the holder includes a compliant section and a rigid section attached to the compliant section, the terminal receiving passageway extends into the rigid section.

16. The terminal locator of claim 13, wherein the terminal receiving passageway has a plurality of cavity features in a cross-sectional plane transverse to the longitudinal direction, the plurality of cavity features include a main cavity feature receiving the terminal and at least one extension cavity feature that does not receive a portion of the terminal.

17. The terminal locator of claim 16, further comprising an insert disposed in the at least one extension cavity feature.

* * * * *